UNITED STATES PATENT OFFICE.

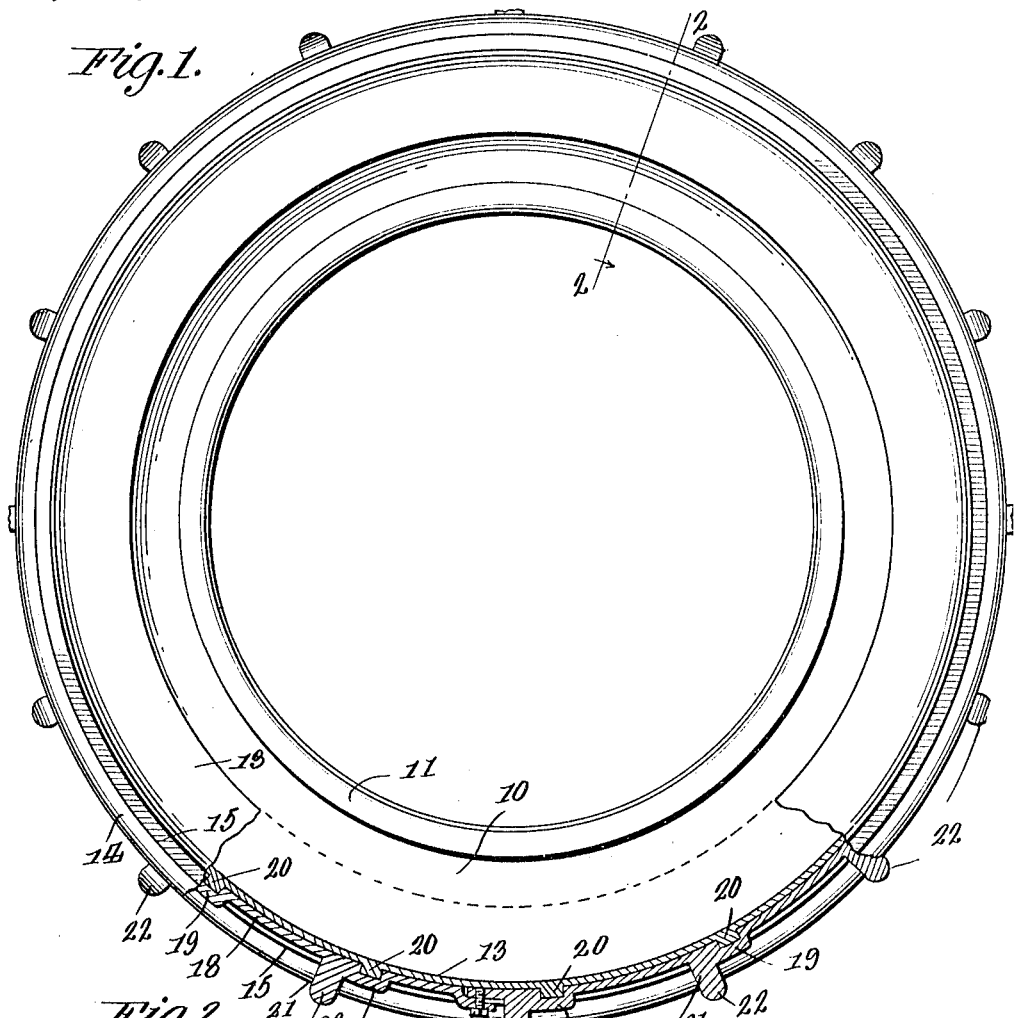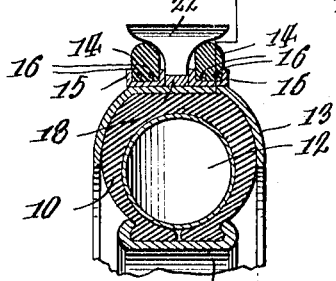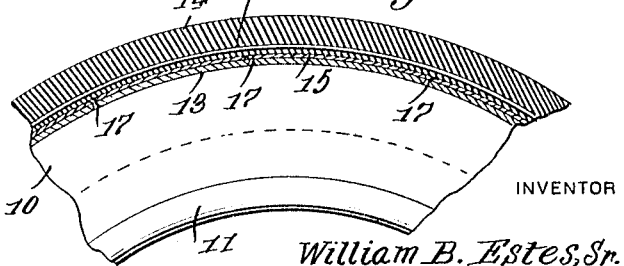

WILLIAM B. ESTES, SR., OF NEWARK, NEW JERSEY, ASSIGNOR OF ONE-FOURTH TO A. LYONS, OF NEWARK, NEW JERSEY.

TIRE-PROTECTOR AND ANTISKID DEVICE.

1,309,515.　　　　　Specification of Letters Patent.　　Patented July 8, 1919.

Application filed February 13, 1917.　Serial No. 148,359.

*To all whom it may concern:*

Be it known that I, WILLIAM B. ESTES, Sr., a citizen of the United States, residing at Newark, in the county of Essex and State of New Jersey, have invented certain new and useful Improvements in Tire-Protectors and Antiskid Devices, of which the following is a specification.

This invention relates to an improved external tire armor or protector and anti-skid device and the principal object of the invention is to provide a protector which will prevent a pneumatic tire from becoming punctured, the protector or external armor being so constructed that it may be put in place with the tire upon the wheel and held in place when the tire is inflated, the tread portion of the protector carrying ground engaging bands between which the anti-skid device will be positioned.

Another object of the invention is to so construct this protector and anti-skid device that the anti-skid device may be removed from the protector when so desired.

Another object of the invention is to so construct the device that the ground engaging band carried by the protector may engage the shoes of the anti-skid device and brace the same against transverse movement.

This invention is illustrated in the accompanying drawings, wherein:—

Figure 1 is a side elevational view showing a wheel having the improved protector and anti-skid device in place, one portion of the improved protector and anti-skid device being shown in longitudinal section, Fig. 2 is a view taken along the line 2—2 of Fig. 1, and Fig. 3 is a fragmentary sectional view taken along the line 3—3 of Fig. 2.

The tire 10 is carried by the rim 11 and is provided with the usual inner tube 12. It should be noted that the tread portion of the tire is flattened although this is not absolutely necessary as the band or body 13 of the protector will conform to the transverse contour of the tire and will have its side portions extending toward the rim 11 to protect the tire from side cuts as well as from punctures through the tread portion of the tire. From an inspection of Fig. 2 it will be readily seen that when the air is let out of the tire, the tire can be easily forced into the band 13 and then inflated thus filling the band and holding the band firmly upon the tire.

The ground engaging strips 14 are carried within the channel irons 15 and are provided with wires 16 which serve to strengthen the strips and further serve to hold the strips in place within the channel irons. These channel irons fit upon the tread portion of the body 13 and are held in place by rivets or other fasteners 17 and it will be seen that a space will be left between the strips 14 to receive the anti-skid device. The anti-skid device is in the form of a collar 18 which engages the tread portion of the body 13 and is provided with enlargements forming sockets 19 to receive the lugs 20 extending from the tread portion of the body 13 and preventing this anti-skid device from moving about the body as the wheel revolves. Arms 21 extend from this collar and terminate in shoes 22 which extend transversely of the protector and are engaged by the strips 14. It will thus be seen that these ground engaging strips will brace the shoes against movement transversely of the protector thus materially assisting in preventing skidding of the automobile. It is not necessary that this anti-skid device be used excepting when running without the same would be dangerous. If it is not desired to use the anti-skidding device, this may be removed by loosening the bolts 23 and the strips 14 would then not only serve as ground engaging strips but would to a certain extent serve as anti-skidding device as these strips would cut into a soft road bed and serve to prevent skidding.

It will thus be seen that there has been provided a very efficient device for protecting a tire against puncture and further that there has been provided a very efficient anti-skidding device which can be removed from the tire protector if so desired.

What is claimed is:—

A tire protector including an annular shield, a plurality of circumferentially spaced lugs formed upon the outer face of said shield, a collar to encircle said shield, a plurality of circumferentially spaced enlargements formed on said collar having recesses in their underside to receive the lug, and an anti-skid lug formed upon each of
5 said enlargements adjacent the ends of said enlargement and spaced circumferentially from said recesses.

In testimony whereof I affix my signature in presence of two witnesses.

WILLIAM B. ESTES, Sr.

Witnesses:
 GRANT SMITH,
 KATE E. WARDLOW.

Copies of this patent may be obtained for five cents each, by addressing the "Commissioner of Patents, Washington, D. C."